United States Patent
Cocks et al.

(10) Patent No.: US 10,554,091 B2
(45) Date of Patent: Feb. 4, 2020

(54) ELECTRIC MACHINE WITH ROTOR, STATOR AND HOUSING COOLING PASSAGES

(71) Applicant: Regal Beloit America, Inc., Beloit, WI (US)

(72) Inventors: Rachele Barbara Cocks, Columbia City, IN (US); Suresh Datal, Hyderabad (IN); Umesh M. Savarkar, Hyderabad (IN); John Sheldon Wagley, Winona Lake, IN (US)

(73) Assignee: Regal Beloit America, Inc., Beloit, WI (US)

(*) Notice: Subject to any disclaimer, the term of this patent is extended or adjusted under 35 U.S.C. 154(b) by 662 days.

(21) Appl. No.: 14/465,869

(22) Filed: Aug. 22, 2014

(65) Prior Publication Data
US 2016/0056682 A1    Feb. 25, 2016

(51) Int. Cl.
*H02K 5/18* (2006.01)
*H02K 9/06* (2006.01)
(Continued)

(52) U.S. Cl.
CPC .............. *H02K 5/18* (2013.01); *H02K 1/32* (2013.01); *H02K 5/20* (2013.01); *H02K 9/06* (2013.01); *H02K 9/10* (2013.01); *H02K 9/14* (2013.01)

(58) Field of Classification Search
CPC ............ H02K 5/18; H02K 9/00; H02K 9/005; H02K 9/02; H02K 9/04; H02K 9/06; H02K 9/08; H02K 9/10; H02K 9/12; H02K 9/14; H02K 9/16; H02K 9/18; H02K 9/19; H02K 9/193; H02K 9/197; H02K 9/20; H02K 9/22; H02K 9/24; H02K 17/16; H02K 5/20; H02K 1/32
(Continued)

(56) References Cited

U.S. PATENT DOCUMENTS

| | | | |
|---|---|---|---|
| 1,996,460 A | * | 4/1935 | Coates ............... H02K 9/06 310/211 |
| 4,757,221 A | * | 7/1988 | Kurihashi ............ H02K 9/06 310/43 |

(Continued)

FOREIGN PATENT DOCUMENTS

| CN | 2929486 Y | 8/2007 |
|---|---|---|
| CN | 201750268 U | 2/2011 |

(Continued)

OTHER PUBLICATIONS

Reliability with higher efficiency, Large LV Motors Type 1LA8 / 1PQ8—(250kW to 1250kW), Technical Datasheet, MOT-02-120-051, Aug. 2008, Siemens, Ltd., Automation and Drives—Motors, Thane Belapur Road Thane—400 601 India.

*Primary Examiner* — Mang Tin Bik Lian
*Assistant Examiner* — Alexander A Singh
(74) *Attorney, Agent, or Firm* — Regal Beloit America, Inc.

(57) ABSTRACT

According to another embodiment of the present invention, an electric machine is provided. The machine includes a housing and a stator. The stator is fixedly secured to the housing. The machine also includes a rotor. The rotor is rotatably secured to the housing. At least one of the housing, the stator and the rotor include an inner wall defining a passageway adapted for improved fluid flow therethrough.

11 Claims, 14 Drawing Sheets

(51) Int. Cl.
    *H02K 5/20*         (2006.01)
    *H02K 9/10*         (2006.01)
    *H02K 9/14*         (2006.01)
    *H02K 1/32*         (2006.01)

(58) Field of Classification Search
    USPC .......... 310/52, 54, 55, 57, 58, 59, 60 R, 61, 310/60 A
    See application file for complete search history.

(56) References Cited

U.S. PATENT DOCUMENTS

| | | | | |
|---|---|---|---|---|
| 4,794,285 | A * | 12/1988 | Nimura | H02K 5/04 310/62 |
| 5,925,947 | A * | 7/1999 | Kajiwara | H02K 9/18 310/58 |
| 6,091,169 | A * | 7/2000 | Umeda | H02K 1/243 310/263 |
| 6,426,580 | B1 * | 7/2002 | Ikeda | H02K 1/243 310/257 |
| 6,633,097 | B2 | 10/2003 | Dunlap et al. | |
| 6,700,235 | B1 * | 3/2004 | McAfee | H02K 9/06 310/52 |
| 2003/0006665 | A1 * | 1/2003 | Kim | D06F 37/304 310/231 |
| 2008/0030086 | A1 * | 2/2008 | Noda | B61C 9/50 310/57 |
| 2008/0150400 | A1 * | 6/2008 | Crowell | H02K 9/06 310/60 R |
| 2012/0001503 | A1 * | 1/2012 | Owng | H02K 9/14 310/54 |
| 2013/0038151 | A1 * | 2/2013 | Ohashi | H02K 1/32 310/59 |
| 2013/0257195 | A1 * | 10/2013 | Airoldi | H02K 9/02 310/53 |
| 2014/0070600 | A1 * | 3/2014 | Park | H02K 5/18 301/6.5 |

FOREIGN PATENT DOCUMENTS

| | | |
|---|---|---|
| CN | 203387364 U | 1/2014 |
| DE | 102004055071 A1 | 5/2006 |
| GB | 2425662 A | 5/1976 |
| JP | 2006325369 A | 11/2006 |
| JP | 4543828 B2 | 9/2010 |
| JP | 4593963 B2 | 12/2010 |
| JP | 4929151 B2 | 5/2012 |
| WO | 2007102740 A1 | 9/2007 |
| WO | 2013000704 A2 | 1/2013 |

* cited by examiner

ELECTRIC MACHINE WITH ROTOR, STATOR AND HOUSING COOLING PASSAGES

BACKGROUND OF THE INVENTION

The embodiments described herein relate generally to an electric machine, and more specifically, to an electric machine which includes features for providing fluid cooling of the machine.

An electric machine is typically in the form of an electric generator or an electric motor. The machine typically has a centrally located shaft that rotates relative to the machine. Electrical energy applied to coils within the motor initiates this relative motion which transfers the power to the shaft and, alternatively, mechanical energy from the relative motion of the generator excites electrical energy into the coils. For expediency the machine will be described hereinafter as a motor. It should be appreciated that a motor may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil. An electric current is directed through the coils which induces a magnetic field. It is the magnetic field that initiates this relative motion which transfers the power to the shaft.

No matter how efficient the motor, the electrical current generates heat. Removing heat from the interior of the motor is desirable for the durability and efficiency of the motor. Motors may have features to facilitate heat transfer away from the motor which in effect facilitates cooling of the motor. Such features fail to provide sufficient fluid flow for effective heat transfer, particularly for large motors and for motors with lower efficiencies.

The present invention is directed to alleviate at least some of these problems with the prior art.

BRIEF DESCRIPTION OF THE INVENTION

According to an embodiment of the present invention, an electric machine is provided. The electric machine includes a housing and a stator fixedly secured to the housing. The electric machine also includes a rotor rotatably secured to the housing. At least one of the housing, the stator or the rotor may include a passageway adapted for improved fluid flow through the housing.

According to an aspect of the present invention, the rotor of the electric machine may define the passageway. The passageway may extend longitudinally.

According to another aspect of the present invention, the rotor of the electric machine may include a second internal periphery defining a second longitudinally extending passageway. The second passageway may be spaced from the first passageway and may be generally spirally shaped.

According to another aspect of the present invention, the rotor of the electric machine may define a rotor protrusion for generating air flow.

According to yet another aspect of the present invention, the rotor of the electric machine may define a rotor fin for generating air flow.

According to yet another aspect of the present invention, the stator of the electric machine may define the passageway, the passageway extending longitudinally.

According to yet another aspect of the present invention, the housing of the electric machine may define the passageway, the passageway extending longitudinally.

According to yet another aspect of the present invention, the housing of the electric machine may include an inner wall or internal periphery defining the passageway. The internal periphery may have opposed end portions extending from a central portion of the internal periphery. The central portion may extend generally parallel to the longitudinal axis of the machine and the end portions extending generally normal to the longitudinal axis of the machine.

According to yet another aspect of the present invention, the end portions of the passageway may be curved.

According to yet another aspect of the present invention, the housing may include a protuberance, the protuberance may include the inner walls or internal periphery forming the passageway.

According to yet another aspect of the present invention, the internal periphery of the housing of the electric machine may have a cross sectional area smaller than the cross sectional area of the end portions.

According to yet another aspect of the present invention, the housing of the electric machine may include an inner wall or an internal periphery defining the passageway. The internal periphery may have opposed end portions extending from a central portion of the internal periphery. The central portion may extend generally parallel to the longitudinal axis of the machine and the end portions may extend generally normal to the longitudinal axis of the machine. The end portions are curved. The cross sectional area of the central portion may be smaller than the cross sectional area of the end portions. The rotor may have a second internal periphery defining a longitudinally extending second passageway. The rotor may have a third internal periphery defining a third longitudinally extending passageway that is spaced from the first passageway and that is generally spirally shaped. The rotor may define a rotor fin for generating air flow.

According to yet another aspect of the present invention, the rotor fin may be positioned adjacent at an end portion of the rotor or to a rotor passageway.

According to yet another embodiment of the present invention, a stator for use in an electric machine is provided. The stator has an internal periphery defining a longitudinally extending passageway adapted for improved fluid flow through the passageway.

According to another aspect of the present invention, the stator may include an internal periphery defining the passageway. The internal periphery may have opposed ends extending from a central portion of the internal periphery. The central portion may extend generally parallel to the longitudinal axis of the machine and the end portions may extend generally normal to the longitudinal axis of the machine.

According to yet another aspect of the present invention, the end portions of the internal periphery may be curved.

According to yet another aspect of the present invention, the cross sectional area of the central portion may be smaller than the cross sectional area of the end portions.

According to yet another aspect of the present invention, the electric machine may be provided, wherein at least one of the housing, the stator and the rotor includes at least one of texture or ribs thereon adapted to improve heat transfer in the electric machine.

According to yet another aspect of the present invention, the electric machine may be provided wherein at least one of the housing, the stator and the rotor define an inner periphery thereof defining at least a portion of the passageway, and wherein the inner periphery includes at least one of texture or ribs thereon adapted to improve heat transfer in the electric machine.

According to yet another embodiment of the present invention, a rotor for use in an electric machine is provided. The rotor has an internal periphery defining a longitudinally extending passageway adapted for improved fluid flow through the rotor.

According to another aspect of the present invention, the rotor may define a second internal periphery defining a second longitudinally extending passageway. The second passageway may he spaced from the first passageway and may be generally spirally shaped.

According to another aspect of the present invention, the rotor may define a rotor fin for generating air flow.

According to another embodiment of the present invention, an electric machine is provided. The machine includes a housing and a stator. The stator is fixedly secured to the housing. The machine also includes a rotor. The rotor is rotatably secured to the housing. At least one of the housing, the stator and the rotor include an inner wall defining a passageway adapted for improved fluid flow therethrough.

According to another aspect of the present invention, the rotor may include the inner wall and the passageway may extend longitudinally.

According to another aspect of the present invention, at least one of the housing, the stator and the rotor may include a second inner wall. The second inner wall may define a second longitudinally extending passageway. The second passageway may be spaced from the first passageway.

According to another aspect of the present invention, the rotor may define a rotor protrusion for generating air flow.

According to another aspect of the present invention, at least one of the stator and the housing may include the inner wall. The passageway may extend longitudinally.

According to another aspect of the present invention, the passageway may include opposed end portions extending from a central portion thereof. The central portion may extend generally parallel to the longitudinal axis of the machine.

According to another aspect of the present invention, the cross sectional area of the central portion may be smaller than the cross sectional area of the end portions.

According to another aspect of the present invention, the end portions may extend at least partially normal to the longitudinal axis of the machine.

According to another aspect of the present invention, at least one of the housing, the stator and the rotor may include a protuberance extending from an external surface of the housing. The protuberance may include at least a portion of the inner wall.

According to another aspect of the present invention, the housing may include the inner wall and the rotor may include a second inner wall defining a second passageway adapted for improved fluid flow therethrough.

According to another aspect of the present invention, at least one of the housing, the stator and the rotor may include at least one of textures or protrusions thereon adapted to improve heat transfer in the electric machine.

According to another aspect of the present invention, the inner wall may includes at least one of texture or protrusions thereon adapted to improve heat transfer in the electric machine.

According to another aspect of the present invention, the one of the at least one of the housing, the stator and the rotor may include the inner wall defining the passageway, the one may further include a plurality of components, and the one of the plurality of components may further include the inner wall defining the passageway.

According to another aspect of the present invention, the one of the plurality of components that includes the inner wall defining the passageway may be in the form of a tube.

According to another embodiment of the present invention, a stator for use in an electric machine is provided. The stator has an inner wall defining a longitudinally extending passageway adapted for improved fluid flow therethrough.

According to another aspect of the present invention, the passageway may have opposed ends extending from a central portion thereof. The central portion may extend generally parallel to the longitudinal axis of the machine and the end portions may extend at least partially normal to the longitudinal axis of the machine.

According to another embodiment of the present invention, a rotor for use in an electric machine is provided. The rotor has an inner wall defining a longitudinally extending passageway adapted for improved fluid flow therethrough.

According to another aspect of the present invention, the passageway may be generally spirally shaped.

According to another aspect of the present invention, the rotor may include a rotor protrusion for generating air flow.

According to another embodiment of the present invention, a method for making an electric machine with improved fluid flow is provided. The method includes the step of providing a stator and the step of providing a housing. At least one of the stator and the housing has an internal periphery defining a passageway. The passageway has opposed end portions extending from a central portion thereof. The central portion extends generally parallel to the longitudinal axis of the machine. The passageways are adapted for improved fluid flow therethrough. The method further includes the step of fixedly securing the stator to the housing, the step of providing a rotor and the step of rotatably securing the rotor to the housing.

According to another aspect of the present invention, the cross sectional area of the central portion is smaller than the cross sectional area of the end portions.

According to another aspect of the present invention, the rotor includes a second inner wall defining a first longitudinally extending rotor passageway, the rotor passageway adapted for improved fluid flow therethrough.

According to another embodiment of the present invention, a method for making an electric machine with improved fluid flow is provided. The method includes the steps of providing a housing and providing a stator. The housing or the rotor includes an inner wall defining the passageway. The inner wall has opposed curved end portions extending from a central portion of the tube. The central portion extends generally parallel to the longitudinal axis of the machine. The end portions extend generally normal to the longitudinal axis of the machine. The passageways are adapted for improved fluid flow through the passageways. The method also includes the steps of fixedly securing the stator to the housing and providing a rotor. The rotor defines a first longitudinally extending rotor passageway and a second longitudinally extending rotor passageway. The passageways are adapted for improved fluid flow through the passageways. The method also includes the step of rotatably securing the rotor to the housing.

According to another aspect of the present invention, the method may be provided such that the rotor passageways are spaced from each other and are generally spirally shaped.

According to another aspect of the present invention, the method may be provided such that the cross sectional area of the central portion of the tube is smaller than the cross sectional area of the end portions of the tube.

According to another aspect of the present invention, the method may be provided such that the rotor defines a rotor fin for generating air flow.

DETAILED DESCRIPTION OF THE INVENTION

Due to increased customer and industry demands, reduced noise and vibration, lower costs, and improved performance in capacity and efficiency are desirable in the design and manufacture of fluid moving devices powered by electric motors. The methods, systems, and apparatus described herein facilitate reduced noise and vibration, lower costs, and improved performance in capacity and efficiency for an electric machine. This disclosure provides designs and methods to reduce noise and vibration, lower costs, and provide improved performance in capacity and efficiency. This disclosure further provides designs and methods to reduce noise and vibration, lower costs, and improved performance in capacity and efficiency.

Technical effects of the methods, systems, and apparatus described herein include at least one of improved performance and quality and reduced labor costs.

Figure 1:
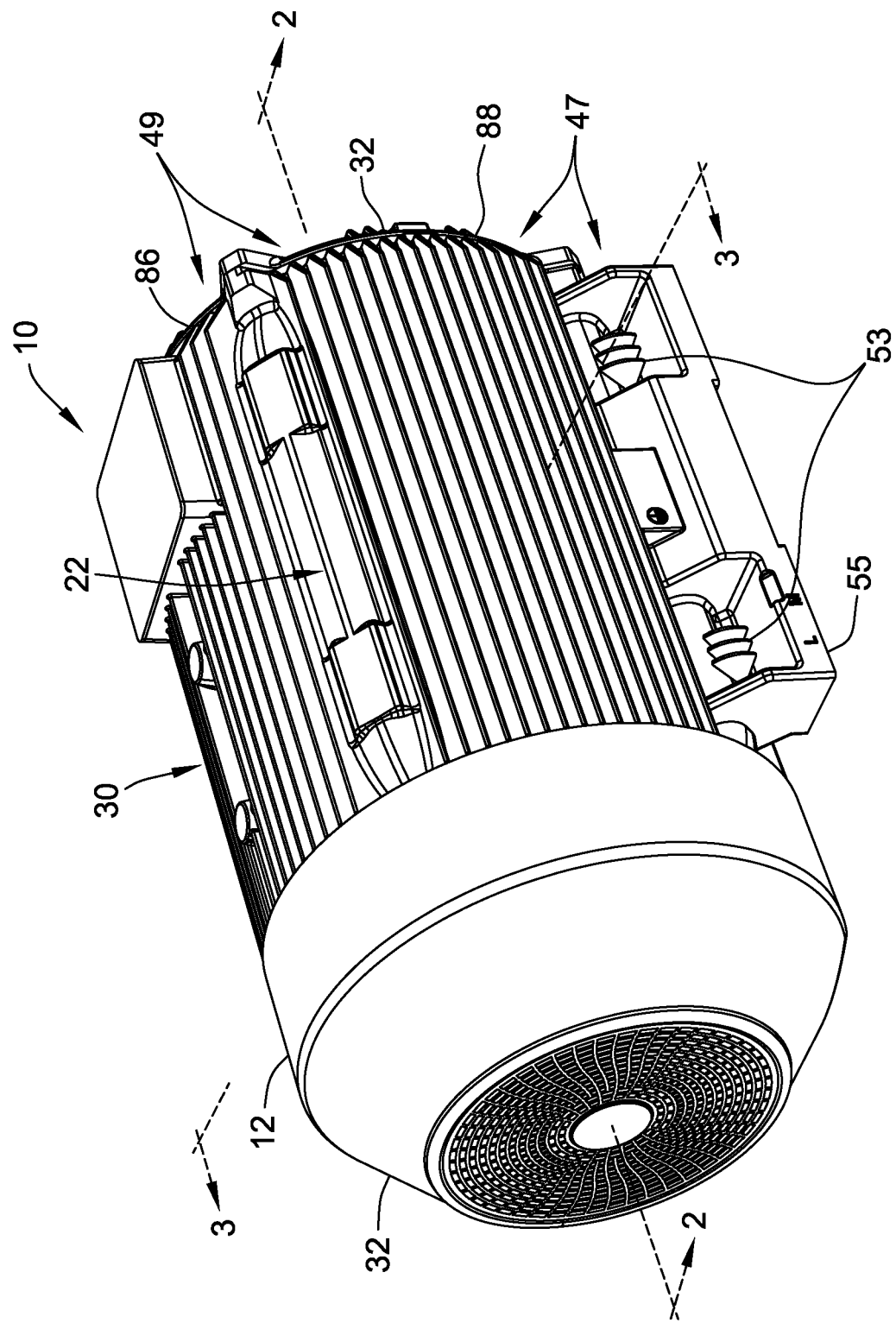
FIG. 1 is a perspective view of an embodiment of present invention in the form of an electric machine.

According to an embodiment of the present invention and referring to FIG. 1, an electric machine 10 is provided. The electric machine 10 may typically be in the form of an electric generator or an electric motor. For simplicity the electric machine will be further described as an electric motor, but it should be appreciated that the present invention is equally suitable for electric motors and electric generators. The electric machine 10 typically includes a frame or housing 12.

Figure 2:
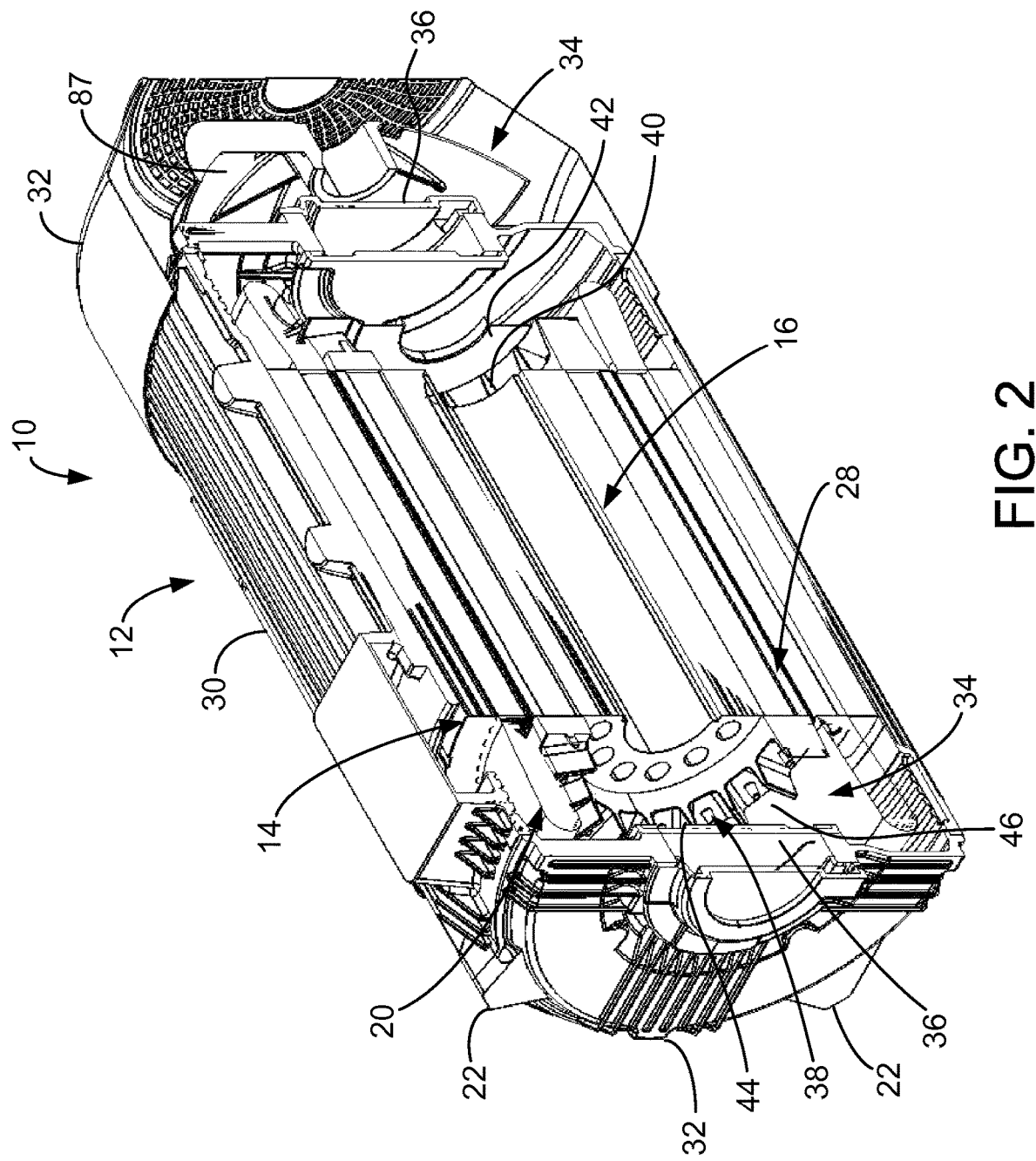
FIG. 2 is a cross sectional view of the electric machine of FIG. 1 along the lines 2-2 in the direction of the arrows.
Figure 3:
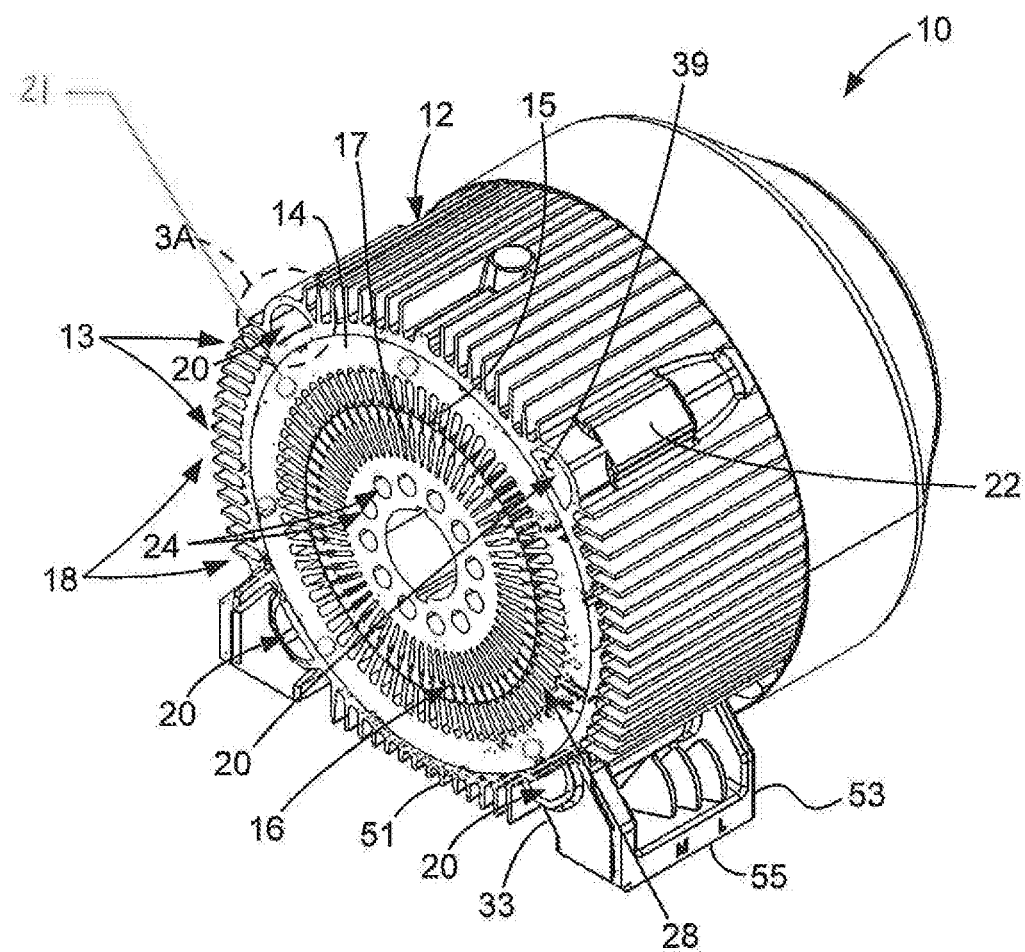
FIG. 3 is a cross sectional view of the electric machine of FIG. 1 along the lines 3-3 in the direction of the arrows.

Referring now to FIGS. 2 and 3, the electric motor 10 is shown in cross section to permit viewing of its internal components. As shown, the electric motor 10 includes the frame or housing 12 and a stator 14 fixedly secured to frame or housing 12. The electric motor also includes a rotor 16 rotatably secured to the housing 12. As shown the motor 10 includes motor passageways 18 adapted for improved fluid flow through the housing 12. It should be appreciated that a solitary passageway 18 may be used, but improved results may be obtained by the use of a plurality of motor passageways 18.

It should be appreciated that the motor passageways 18 may include internal openings formed in internal walls or internal peripheries 13 of the basic motor components such as the motor housing 12, the stator 14, and the rotor 16. It should be appreciated that the internal peripheries 13 may be located in portions of the component that are adapted to provide the internal peripheries 13. The passageways 18 may also include spaces between the basic motor components such as the motor housing 12, the stator 14, and the rotor 16. The motor passageways 18 may also be formed by inner walls of fluid flow components, such as pipes or tubes or any other motor component for which passage of a fluid therethrough may be provided. Such pipes and tube may be connected to and are associated with at least one of the motor housing, the stator, and the rotor. The motor housing, the stator, and the rotor may as shown be integral or modular and the pipes and tubes, if used, may be considered to be a part of at least one of the motor housing, the stator, and the rotor.

Referring again to FIGS. 2-3, the motor passageways 18 may also include a stator housing passageway 20 associated with the stator 14 of the motor 10. The stator housing passageway 20, as shown, is in form of an internal opening in housing 12.

For example and as is shown in FIG. 1, the housing 12 may include raised portions or protuberances 22 extending from the external surface of the housing 12 to provide at least a portion of the internal periphery defining the stator housing passageways 20.

While the housing 12 may include a single stator housing passageway, preferably and as shown in FIG. 1, the housing 12 may include additional stator housing passageways 20 positioned spaced apart from each others. The stator housing passageways 20 may be equally spaced from each other, as shown, or have any location pattern necessary to accommodate other components or to optimize fluid flow.

As shown in FIG. 3, there are four (4) equally spaced apart stator housing passageways 20. It should be appreciated that any number, for example two, three, five, six, or more tubes with passageways, may he used. The passageways 20 may be sized for optimum fluid flow.

It should also be appreciated that adaptations to the passageways for improvement of fluid flow may be in the form of arcuate shapes in the passageways as they changes linear direction. Further, the adaptations may be in the form of changes in the cross-sectional area of the opening along the passageway. Larger dross-sectional area of the opening at the ends of the openings may lend to improved fluid flow.

Typically a motor includes magnetic field generating components connected to the rotor. The magnetic field generating components are use to urge the rotor into rotation relative to the stator. The magnetic field generating components may be electromagnetic field generating components in the form of electromagnetic coils or magnetic field generating components in the form of magnetic materials, such as ferrite or neodymium. The magnetic field generating components connected to the rotor cooperate with magnetic field generating components connected to the stator, for example, electromagnetic coils. The magnetic field generating components in the rotor and the magnetic field generating components in the stator urge the rotor to rotate relative to the stator, thus causing the motor to operate.

As shown in FIGS. 1-3, the stator 14 includes magnetic field generating components in the form of stator coils 15 that are positioned adjacent the stator 14. The rotor 16 includes magnetic field generating components in the form of rotor coils 17. It should be appreciated that alternate magnetic field generating components, for example magnets, may be used to generate the magnetic fields.

As shown in FIGS. 1-3, the housing 12 provides the stator housing passageways 20 formed internally therein for cooling the stator 14. Alternatively, the stator 14 may provide stator passageways 21 formed internally therein. Alternatively, separate components, for example tubes or pipes, may form the stator passageways.

Referring again to FIGS. 2-3, the rotor 16 of the motor 10 may include a rotor passageway 24. The rotor passageway 24, as shown, is in form of an internal opening in rotor 16. While the rotor 16 may provide a single rotor passageway, preferably and as shown in FIGS. 2-3, the rotor 16 of the motor 10 may be formed with additional rotor passageways 24 positioned spaced apart from each other. The rotor passageways 24 may he equally spaced from each other, as shown, or may be positioned in any location pattern necessary to accommodate other components or to optimize fluid flow. As shown in FIGS. 2-3, there are approximately (12) equally spaced-apart rotor passageway 24. It should be appreciated that any number, for example two, three, five, six, or more rotor passageways may be used. The rotor passageways 24 may be sized for optimum fluid flow.

While, as shown in FIGS. 2-3, the rotor passageway 24 is formed in rotor 16, it should be appreciated that the rotor passageways may be provided as an internal opening in a rotor component such as a rotor tube or a rotor pipe.

The rotor 16, as stated above, includes the magnetic field generating components 17 in the form of rotor coils 17 that are positioned adjacent the rotor passageways 24. Alternately the magnetic field generating components may be magnets typically made of ferrous metals (not shown), but alternative magnet materials may be used.

As shown in FIGS. 2-3, a space 28 is shown between the stator 14 and the rotor 16. It should be appreciated that the space 28 may be in the form of an air gap that exists between the stator 14 and the rotor 16 to permit the rotor 16 to rotate relative to the stator 14.

Referring again to FIG. 2, the housing 12 of motor 10 may include a hollow cylindrical portion 30 and opposed end caps or shields 32 connected to the cylindrical portion 30. Channels 34 for fluid flow between the stator 14 and rotor 16 are provided within the end caps 32.

The channels 34 serve to provide a fluid passageway from the stator housing passageways 20 to the rotor passageways 24. The channels may in part be formed by the end caps 32 and may, as shown in FIGS. 2-3, be in part formed by a shield or flow diverter 36 positioned within the end caps 32, between the end caps 32 and the stator 14. The shield 36 may have any suitable shape and may have a shape adapted to improve fluid flow including generally smooth contours. The shield 36 may be place within one or both end caps 32. The shield may be made of any suitable, durable material and may be made of a metal, a polymer or a composite.

Figure 3A:
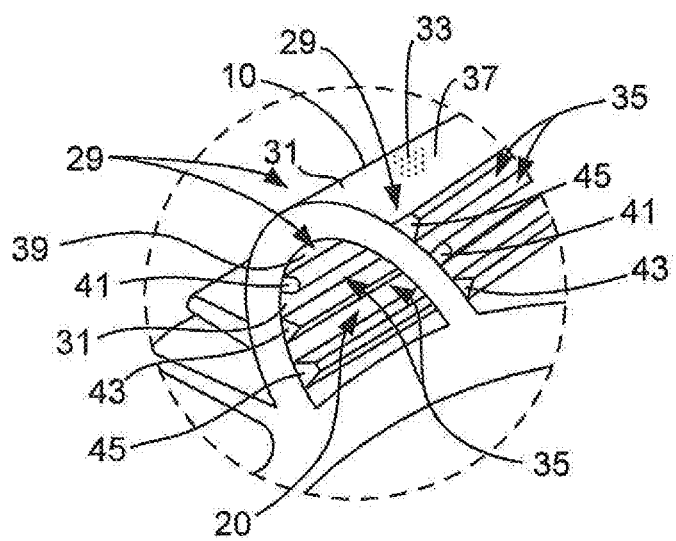
FIG. 3A is a partial perspective of the electric machine of FIG. 1 showing heat transfer assisting features of the electric machine of FIG. 1 in greater detail.
Figure 4:
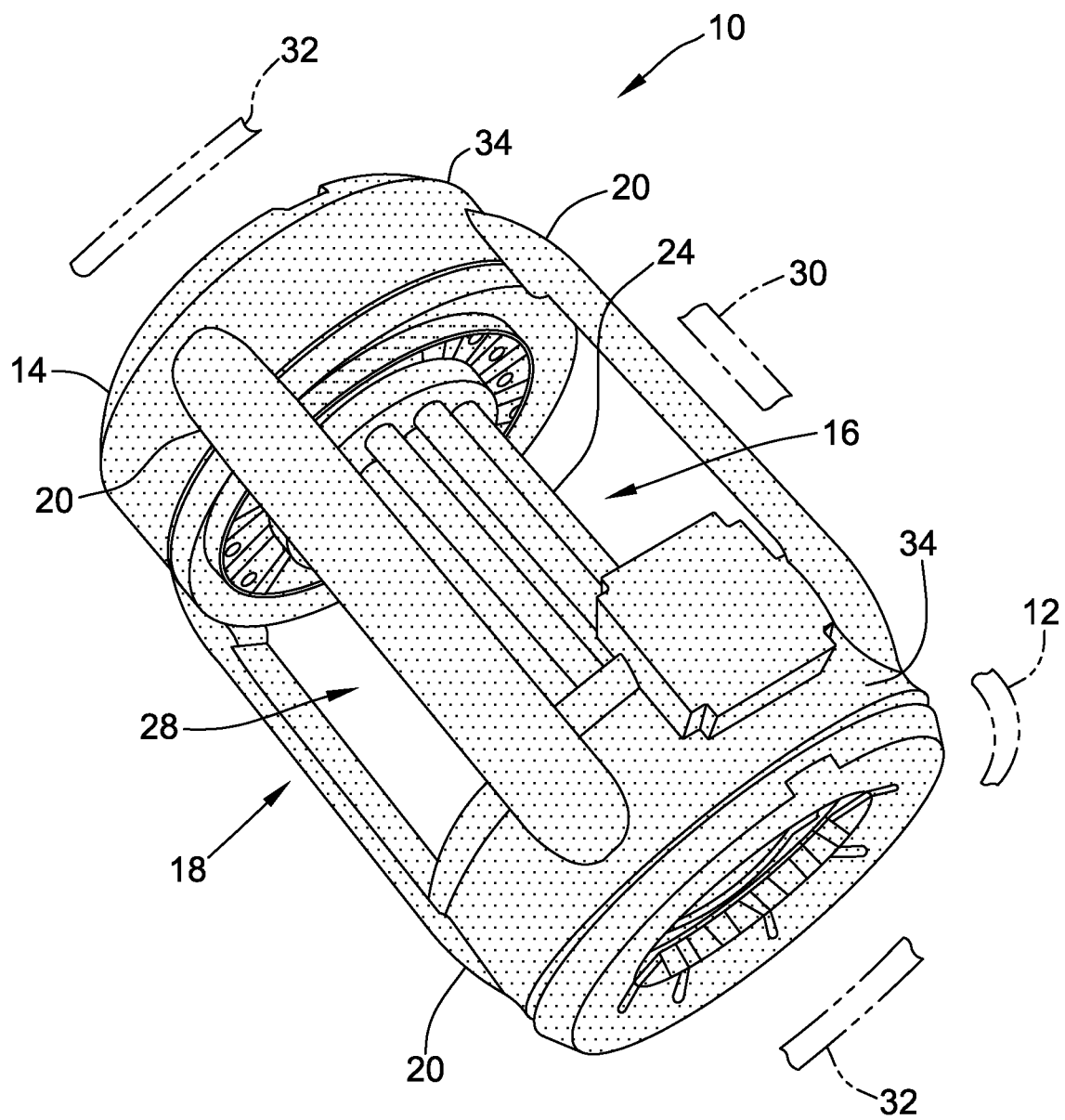
FIG. 4 is a perspective view of the voids formed between the components of the electric machine of FIG. 1, the voids providing fluid flow channels in accordance with the present invention.

Referring to FIGS. 3 and 3A, the electric motor 10 may include heat transfer features 29 that may be applied to surfaces 31 of the motor 10. The features 29 may, for example, be applied to any surface of the motor, either interior or exterior. Preferably, the features 29 are applied to surfaces that are adjacent the passageways 18.

The heat transfer features 29 may include textures 33 and protrusions 35. The protrusions 35 may be in the form of fins or ribs or may have any other shape. Other features, either extending outwardly from the surface or inwardly may be used. For example and as shown in FIG. 3A, the heat transfer features 29 may be positioned on external surfaces 37 of motor 10, for example those of housing 12, or on internal surface 39 of motor 10, for example those of housing 12 where stator housing passageways 20 are formed.

The textures 33 may have any shape and may be applied as part of the formed or cast shape of the component or may be applied as a separate process, for example by welding, spraying or coating.

The protrusions or ribs 35 may have any shape and may be applied as part of the formed or cast shape of the component and may be applied as a separate process, for example by welding, spraying or coating. The ribs 35 may, for example, be in the form of a arcuately shaped rib 41, a triangularly shaped rib 43 or a trapezoidally shaped rib 45. The ribs 35 may extend longitudinally, for example linearly and/or arcuately, for example spirally along the surface of the motor 10.

It should be appreciated that the heat transfer features 29 including those in the form of textures 33 and ribs 35 may be applied anywhere along the passageways 18. For example, the heat transfer features 29 including those in the form of textures 33 and ribs 35 may be applied to the interior surfaces of rotor passageways 24.

Referring again to FIG. 2, fluid flow assisting devices 38 may be positioned in the motor 10 to assist fluid flow. For example and as shown in FIG. 2, the fluid flow assisting devices 38 may be in the form of fins or blades that are attached to a moving component, for example rotor 16. As shown, the motor 10 may include a first fin or blade 40 positioned on a first end 42 of rotor 16. While a single first fin 40 may be used, preferably and as shown a plurality of first fins 40 may be used. The fins 40 may, as shown, be equally spaced.

As shown the motor 10 may include a second fin 44 positioned on a second end 46 of rotor 16. While a single second fin 44 may be used, preferably and as shown a plurality of second fins or blades 44 may be used. The fins 44 may as shown, be equally spaced.

For fluid flow, a pressure gradient should be present in the fluid flow path. Thus, the first fins 40 and the second fins 44 should be adapted to expedite that pressure gradient and resultant fluid flow. For example, one set of fins may be larger or one set of fins may have a greater number of fins, so that flow from the sets of fins are different from each other, thus promoting the pressure gradient and flow. For example and as shown in FIG. 2, the first fins 40 are larger fins and the second fins 44 are smaller fins.

Referring again to FIGS. 1-3, the housing 12 may include external fins 47 for promoting cooling of the motor 10. For example the housing 12 may include central fins 49 positioned on the central portion 30 of the motor housing 12; lower fins 51 positioned on lower surface of the motor 10; and support feet fins 53 positioned on and above support feet 55 of the motor 10. The fins 47, 49, 51 and 53 may be positioned adjacent passageways 18 to improve their effectiveness.

The electric motor 10, as shown in FIGS. 4-9, shows the voids or spaces in the motor. These voids or spaces are depicted in FIGS. 4-9 as filled with a dotted pattern. These views of the motor 10 provide a better understanding of the improved air flow path provided by the present invention. While the voids and spaces are shown, at least some of the motor components including portions of the stator and the rotor have been removed from the motor 10 to shown the passageways in greater detail. Channels 34 for fluid flow between the stator and rotor are provided beneath the end caps 32.

Figure 5:
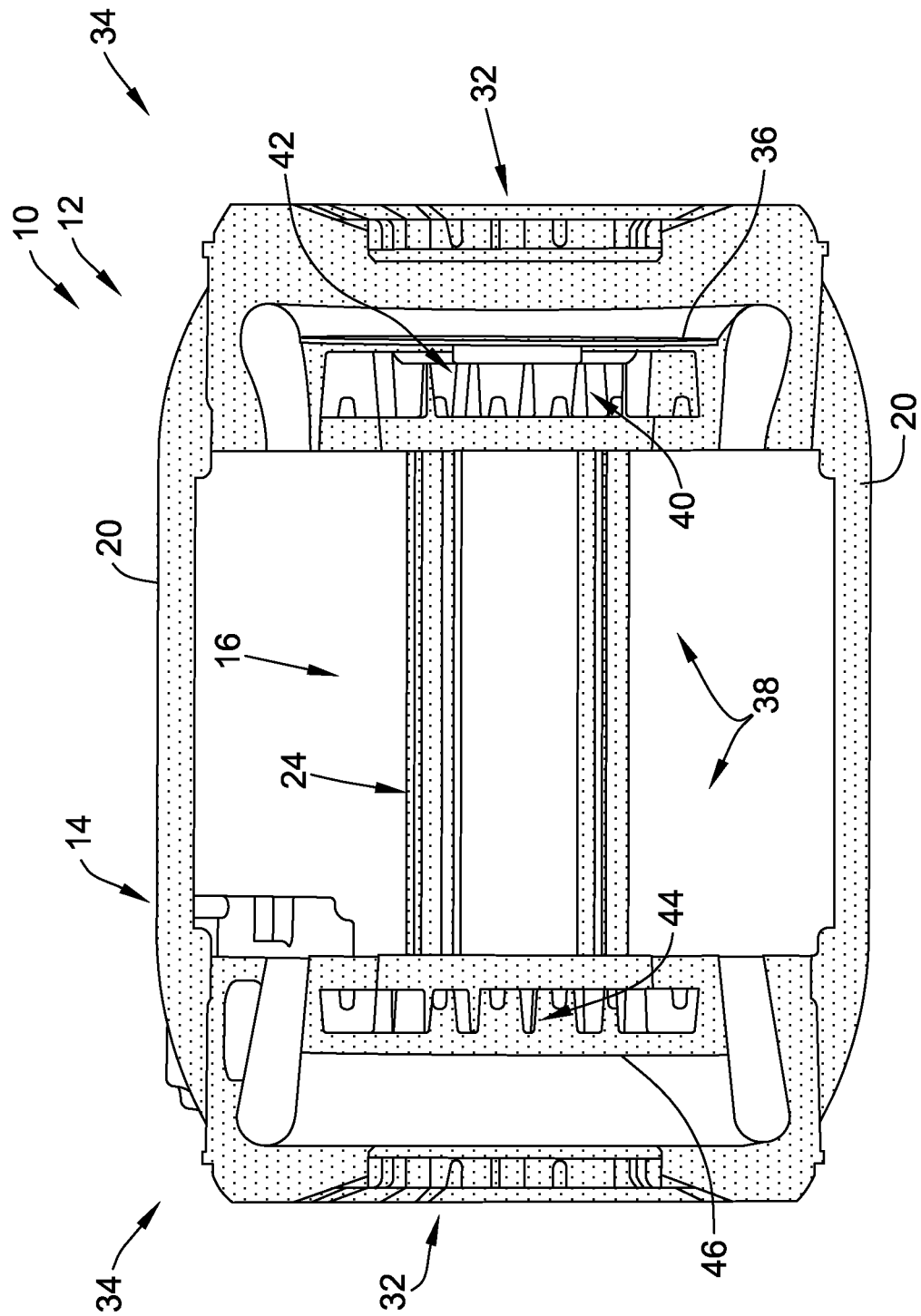
FIG. 5 is a cross sectional view of the voids formed between the components of the electric machine of FIG. 1 cut through the protuberances in the housing forming stator housing passageways.

Referring now to FIG. 5, the channels 34 of the end caps 32 are shown in greater detail. The channels 34 serve to provide a fluid passageway from the stator housing passageways 20 to the rotor passageways 24. The channels may in part be formed by the end caps 32 and may, as shown in FIGS. 2-3, be in part formed by a shield or flow diverter 36 positioned within the end caps 32, between the end caps 32 and the stator 14. The shield 36 may have any suitable shape and have a shape adapted to improve fluid flow including generally smooth contours. The shield 36 may be place within one or both end caps 32. The shield may be made of any suitable, durable material and may be made of a metal, a polymer or a composite.

The rotor passageways 24 may be in the form of rotor internal cavities or channels defined by an inner wall or internal periphery of the rotor, as shown in FIG. 5. The rotor passageways or channels 24 are formed in the rotor 14.

The fluid flow assisting devices 38 may be positioned in the motor 10 to assist fluid flow. For example and as shown in FIG. 5, the fluid flow assisting devices 38 may be in the form of fins or blades that are attached to a moving component, for example rotor 16. As shown the motor 10 may include a first fin 40 positioned on a first end 42 of rotor 16. While a single first fin 40 may be used, preferably and as shown a plurality of first fins 40 may be used. The fins 40 may as shown, be equally spaced.

As shown the motor 10 may include a second fin 44 positioned on a second end 46 of rotor 16. While a single second fin 44 may he used, preferably and as shown a plurality of second fins 44 may be used. The fins 44 may as shown, be equally spaced.

For fluid flow, a pressure gradient should be present in the fluid flow path. Thus the first fins 40 and the second fins 44 should be adapted to expedite that pressure gradient and resultant fluid flow. For example, one set of fins may be larger or one set of fins may have a greater number of fins, so that flow from the sets of fins are different from each other, thus promoting the pressure gradient and flow. For example and as shown in FIG. 5, the first fins 40 are larger fins and the second fins 44 are smaller fins.

Figure 6:
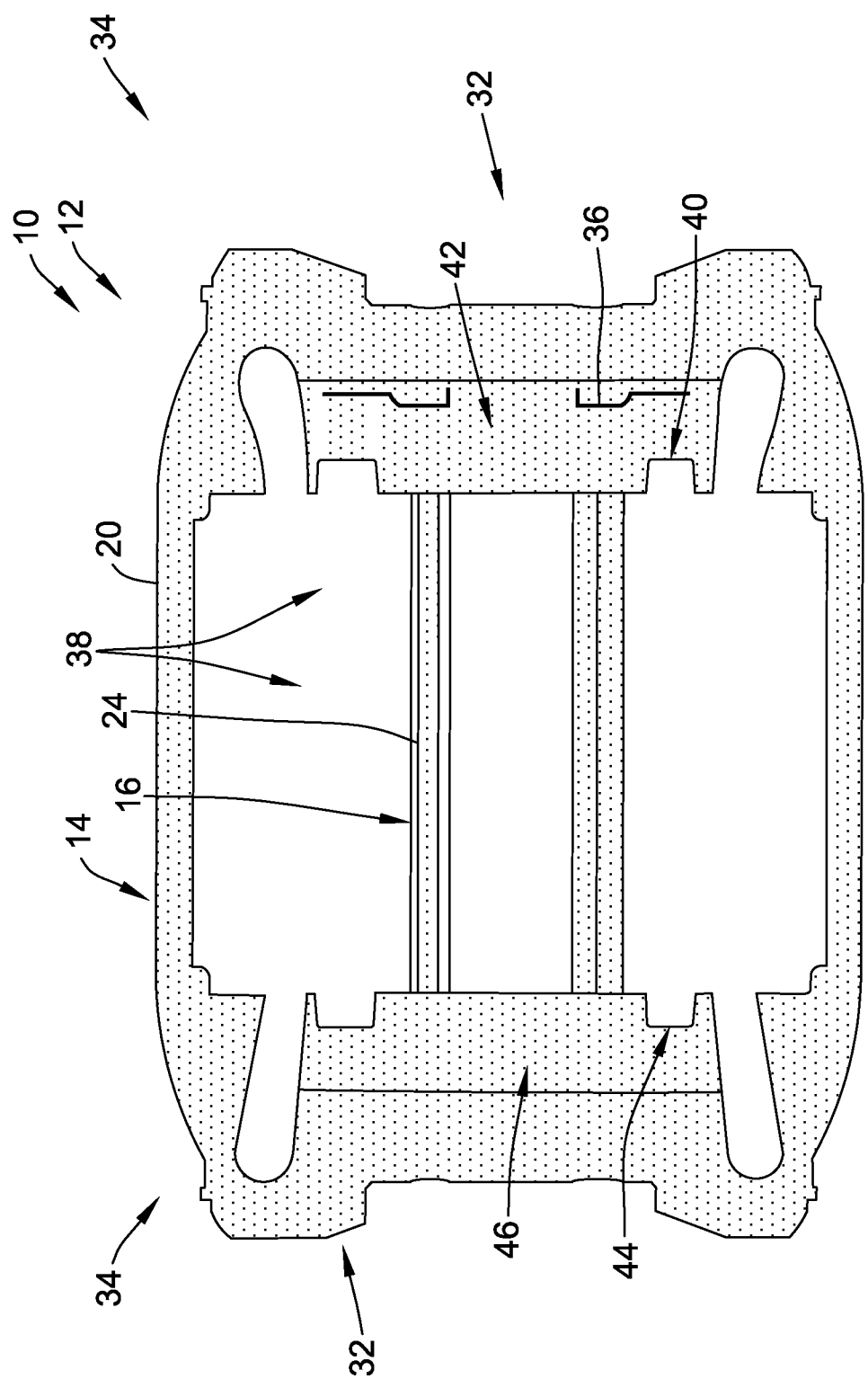
FIG. 6 is a cross sectional view of the voids formed between the components of the electric machine of FIG. 1 cut through the protuberances in the housing forming stator housing passageways, showing the flow diverter.

Referring now to FIG. 6, the fluid flow assisting device or shield 36 is shown in greater detail. The shield 36 may, as shown, be positioned aligned with the first fins 40. While, as shown the shield 36 is positioned aligned with the first fins 40, it should be appreciated that an additional shield 36 may be positioned aligned with the second fins 44 as well. The shield 36 over the rotor fins 40 creates a suction force through the center of the rotor opening.

Figure 7:
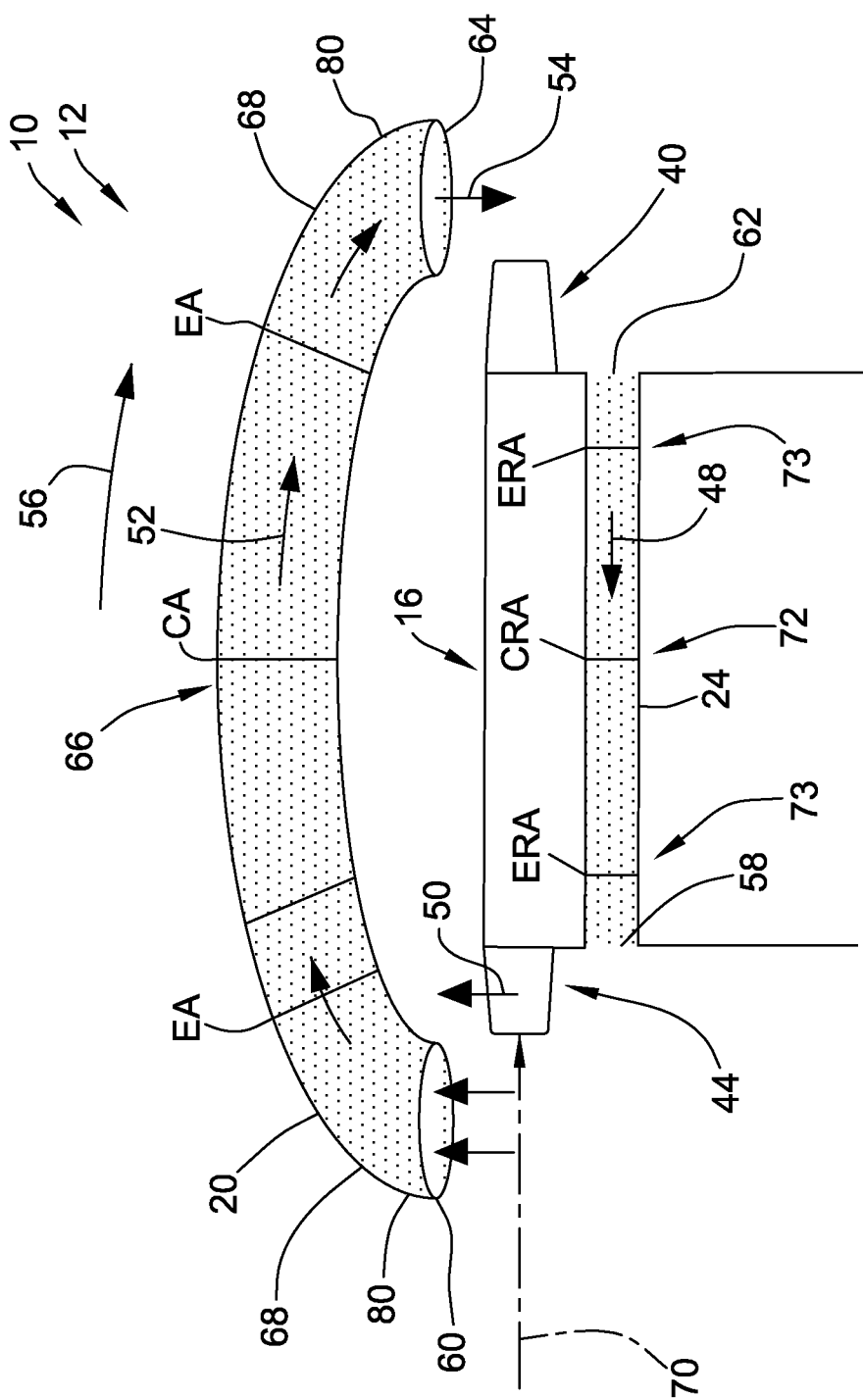
FIG. 7 is a partial perspective view of FIG. 4, showing the voids forming the stator housing passageways and the rotor passageways in greater detail.

Referring now to FIG. 7, one of the stator housing passageways 20 and a portion of rotor 16 of motor 10 are shown in greater detail. The portion of the rotor 16 includes one of the rotor passageways 24. According to the present invention, the motor 10 is adapted to provide improved fluid flow through the motor 10. For example fluid flows in the direction of arrow 48 through the rotor passageway 24, radially outward in the direct of arrow 50 to the stator housing passageway 20, through the stator housing passageway 20 in the direction of arrow 52, and then radially inward in the direct of arrow 54 to the rotor passageway 24, completing a fluid flow path 56. It should be appreciated that flow in the opposite direction may be alternately provided.

The components of the motor 10 that provide the fluid flow path 56 are adapted to improve the fluid flow. The fluid flow may be a convective flow or may be a forced flow. For example and as shown in FIG. 5, the motor 10 may include, positioned between rotor passageway outlet 58 and stator housing passageway inlet 60, a stator inlet flow device in the form of for example, the second rotor fin 44.

The motor 10 may also include, positioned between rotor passageway inlet 62 and the stator housing passageway outlet 64, a stator outlet flow device in the form of for example, a first rotor fin 40. The fins 40 and 44 serve to advance fluid flow along the fluid flow path 56.

For improved flow of a fluid through a passageway, the inlet fluid pressure should be greater than the outlet fluid pressure. Higher fluid pressure at the inlet may be provided by a flow device, for example the rotor fins 40 and 44. The fins 40 and 44 may be provided such that the first rotor fin 40 provides greater fluid flow than second rotor fin 44. Typically the first rotor fin 40 is thus larger than the second rotor fin 44.

For improved flow of a fluid through a passageway, the cross sectional area in the middle of the passageway should be smaller than the cross sectional area in the ends of the passageway. The stator housing passageway 20 preferably has a central cross sectional area CA at central portion 66 of the passageway 20 that is smaller than the end cross sectional area EA at end portions 68 of the passageway 20. A portion of the central portion 66 may extend generally parallel to the rotational axis 70 of rotor 16 and a portion of the end portions 68 may extend at least partially in a direction normal to the rotational axis 70 of rotor 16. For improved flow of a fluid through a passageway, any change in direction of the fluid in the passageway should be gradual. Thus, the stator housing passageways 20 should include end portions 68 with smooth, gradually changing, arcuate portions 80 where the direction of flow is changed from axial flow to radial flow.

It should be appreciated that a similar design of the rotor passageways 24 may be provided with the rotor passageways 24 having a rotor central cross sectional area RCA at central portion 70 of the rotor passageways 24 that is smaller than rotor end cross sectional area REA at the end portions 73 of the rotor passageways 24.

Figure 8:
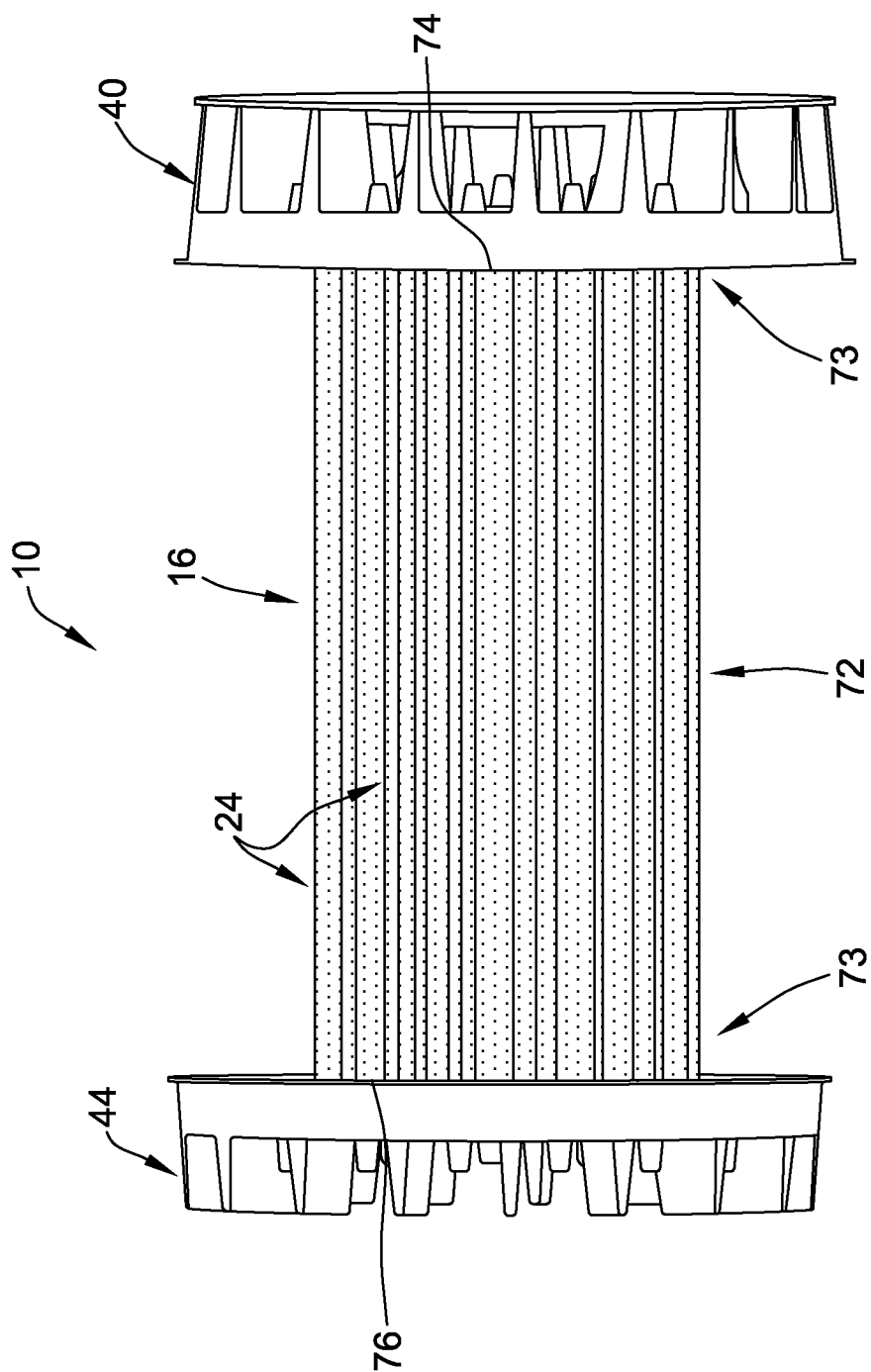
FIG. 8 is a plan view of the rotor of the electric machine of FIG. 1, showing the rotor fins and rotor passageways in greater detail.

Referring now to FIG. 8, the rotor 16 is shown in greater detail. The rotor 16, as shown, includes a plurality equally spaced-apart rotor passageways 24. The passageways 24 are sized for optimum fluid flow. The passageways 24 may have a smaller cross sectional areas in central portion 72 of the passageways 24 may have a larger cross sectional areas in the end portions 73 of the passageways 24, similar to the stator housing passageways 20, as shown in FIG. 7. The rotor 14 may include a central opening 65 (see FIG. 10) for receiving a motor shaft (not shown). The passageways 24 of the rotor 14 extend from an fluid inlet end 74 to a fluid outlet end 76.

Figure 9:
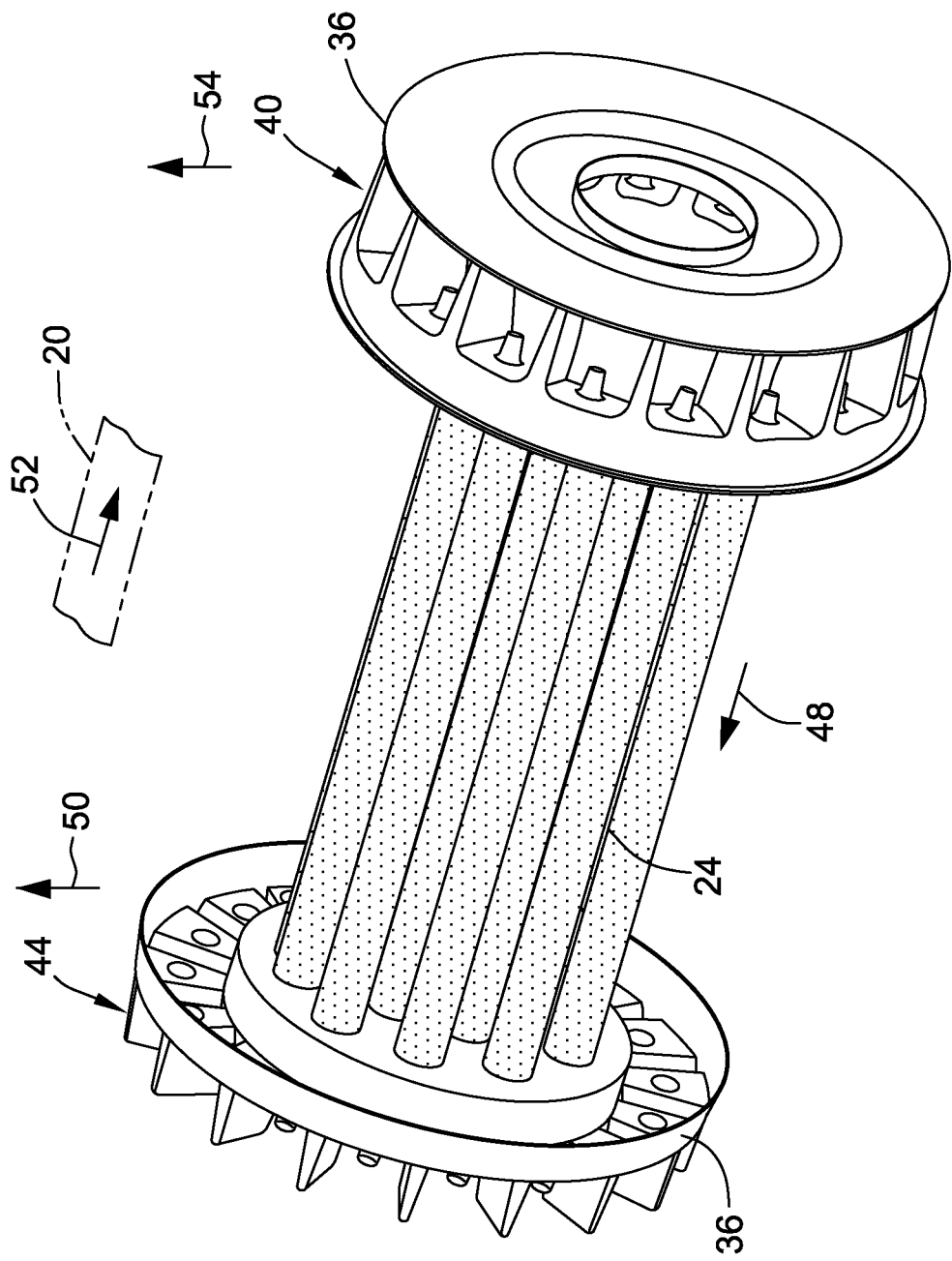
FIG. 9 is a perspective view of the rotor of FIG. 8.

Referring now to FIG. 9, the fins 40 and 44 and the shield 36 are shown in greater detail. The moving fins 40 and 44 create pressure gradients. The moving fins 40 and 44 create low pressure behind the fins and high pressure in front of the fins. This low pressure behind the blade pulls fluid into the flow. Stronger momentum forces are obtained by the larger first fins 40, than the forces obtained by the smaller second fins 44.

In general fluid flows from high pressure to low pressure. As shown in FIG. 9, fluid flows from high pressure in front of the large first fins or blades 40 in the direction of arrow 48 toward small second fins or blades 44. Then, fluid flows from high pressure in front of the small second fins or blades 44 in the direction of arrow 50 toward stator housing passageways 20. Next, fluid flows from high pressure in the direction of arrow 52 through stator housing passageways 20. Finally, fluid flows from high pressure in the direction of arrow 54 toward rotor passageways 24.

Referring again to FIG. 1, the housing 12 of the motor 10 of FIG. 1 is shown in greater detail. The housing 12, as shown, preferably includes external fins 47 on surface 86 of housing 12. The external fins 47 provide for cooling of the housing 12 and the motor 10. The fins 47 may provide any combination of convective and conductive cooling. A fan 87 (see FIG. 2) may be place on the external portion of the housing 12, preferably at an end cap 32 of the motor 10 to assist in convective cooling of the fins 47. The fins 47 may preferably and as shown include stator housing passageway aligned fins 88 positioned in alignment with the stator housing passageway 20 to assist in cooling the motor 10.

Figure 10:
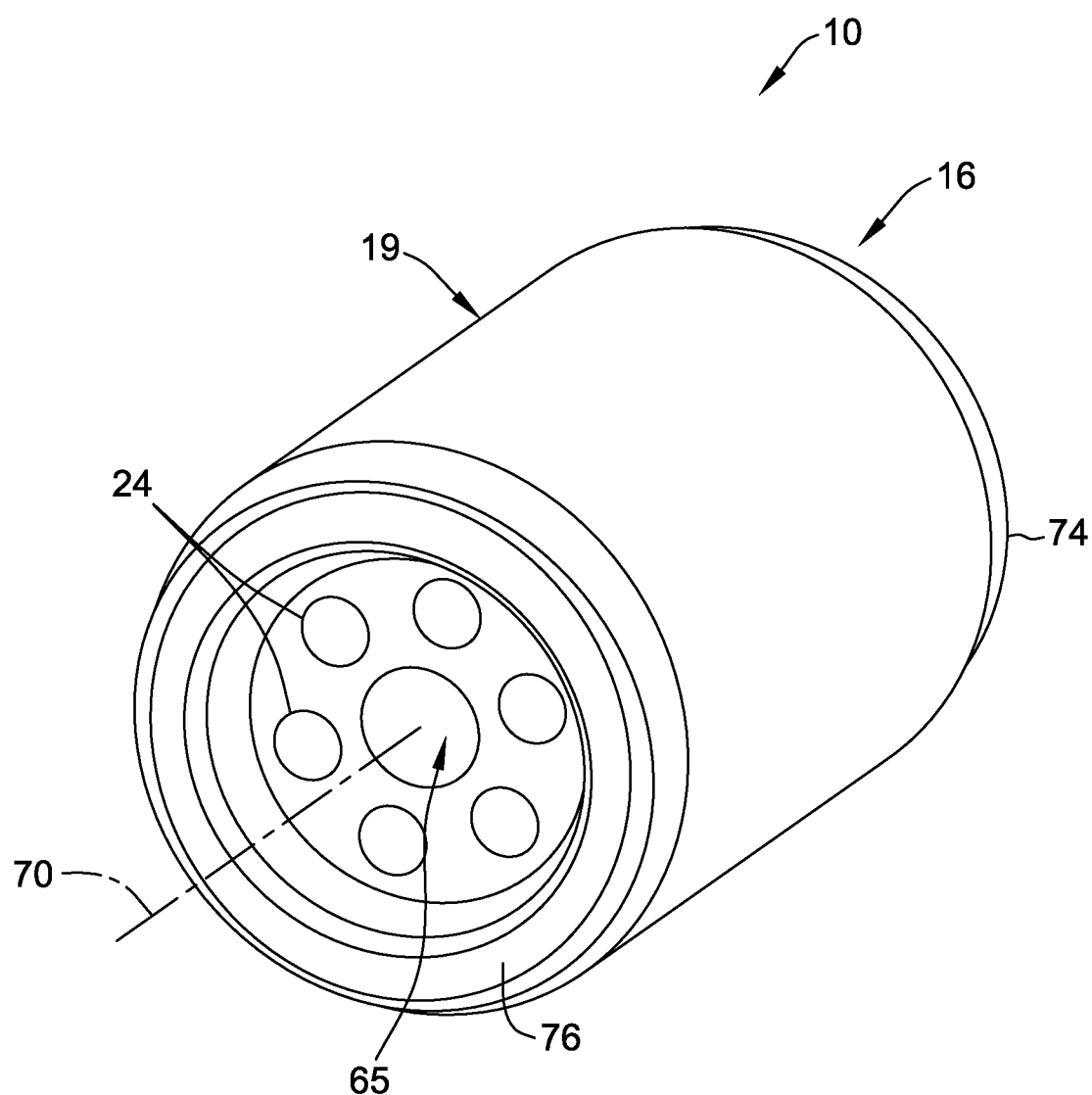
FIG. 10 is a perspective view of another embodiment of the present invention in the form of a rotor for use in an electric machine with passageways formed in the rotor.
Figure 11:
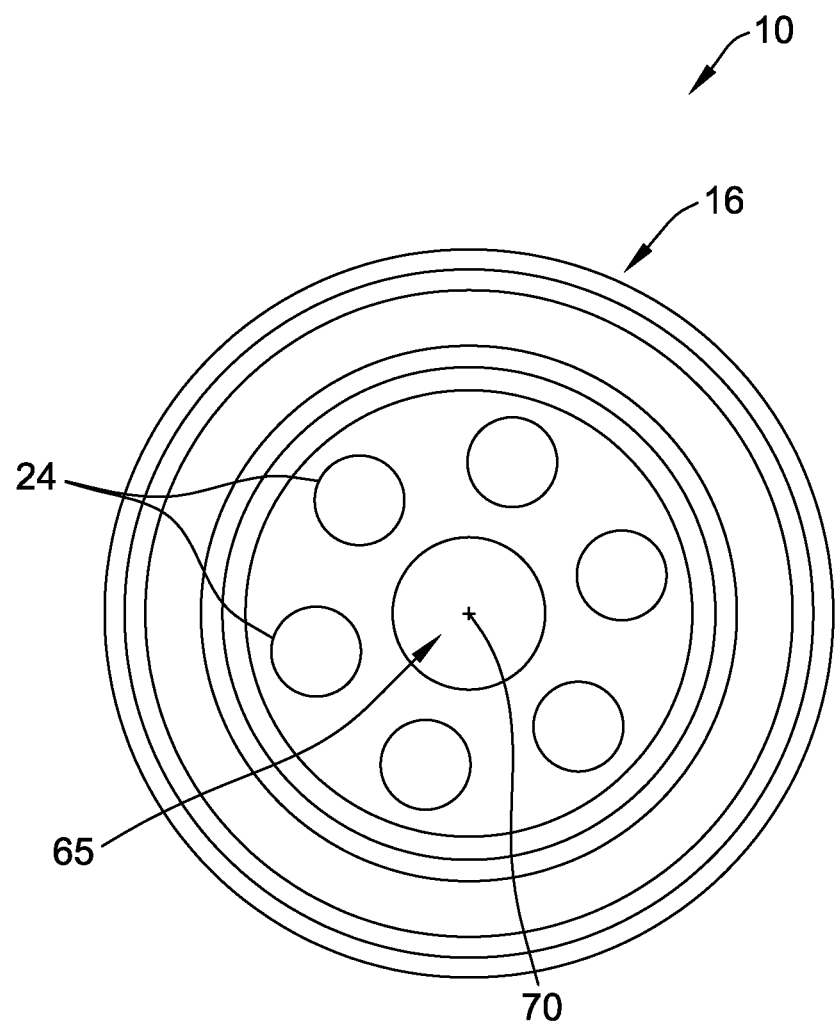
FIG. 11 is an end view of the rotor of FIG. 10.
Figure 12:
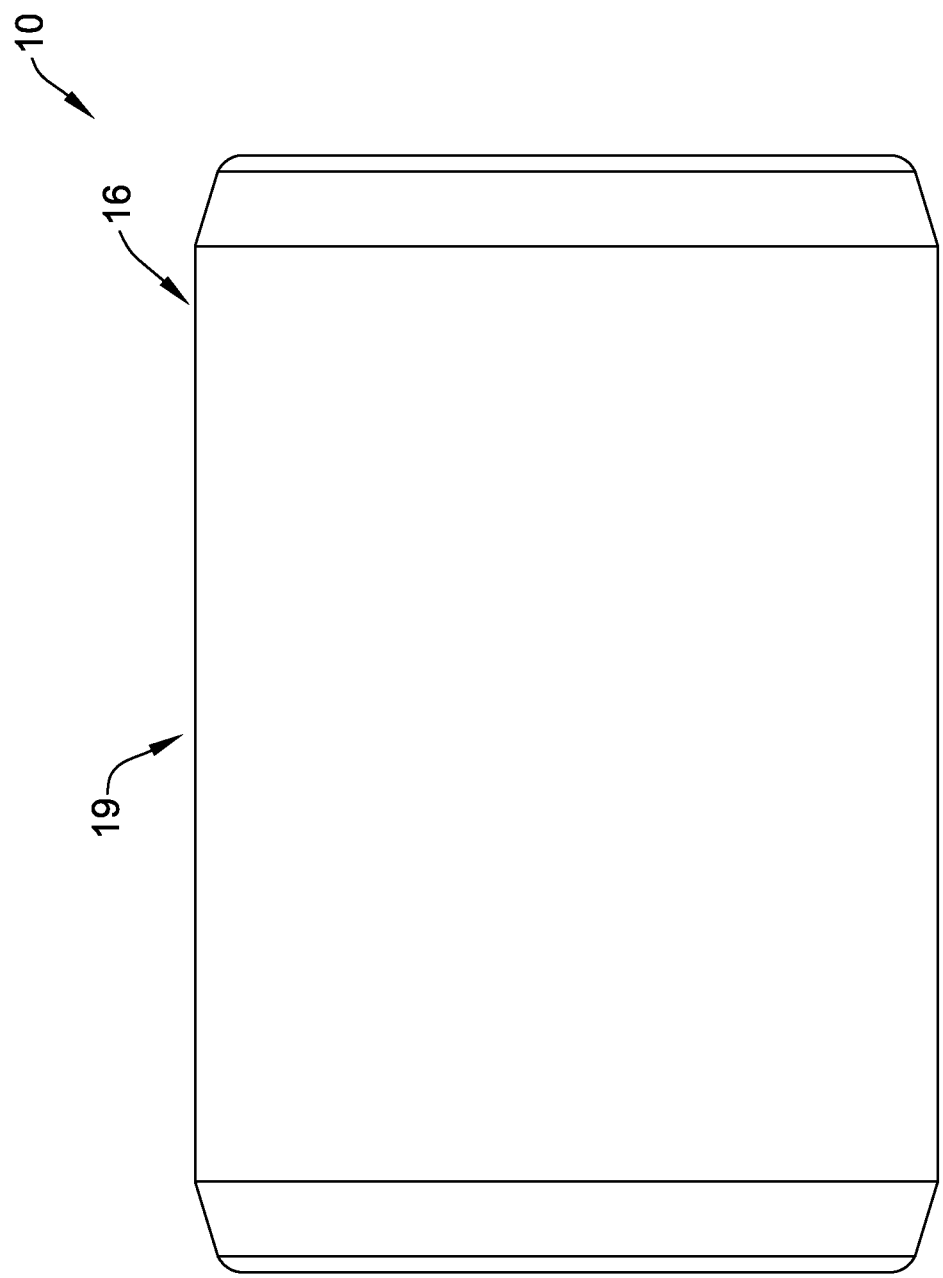
FIG. 12 is an side view of the rotor of FIG. 10.

Referring now to FIGS. 10-12, core 19 of rotor 16 of motor 10 is shown in greater detail. The rotor 16, as shown, includes a plurality equally spaced-apart rotor passageways 24. The passageways 24 are sized for optimum fluid flow and may be have smaller cross sectional areas in the middle of the passageways 24. The rotor 14 may include a central opening 65 for receiving a motor shaft (not shown). The passageways 24 of the rotor 14 extend from a fluid inlet end 74 to a fluid outlet end 76 in a direction parallel to rotational axis 70 of rotor 16.

Figure 13:
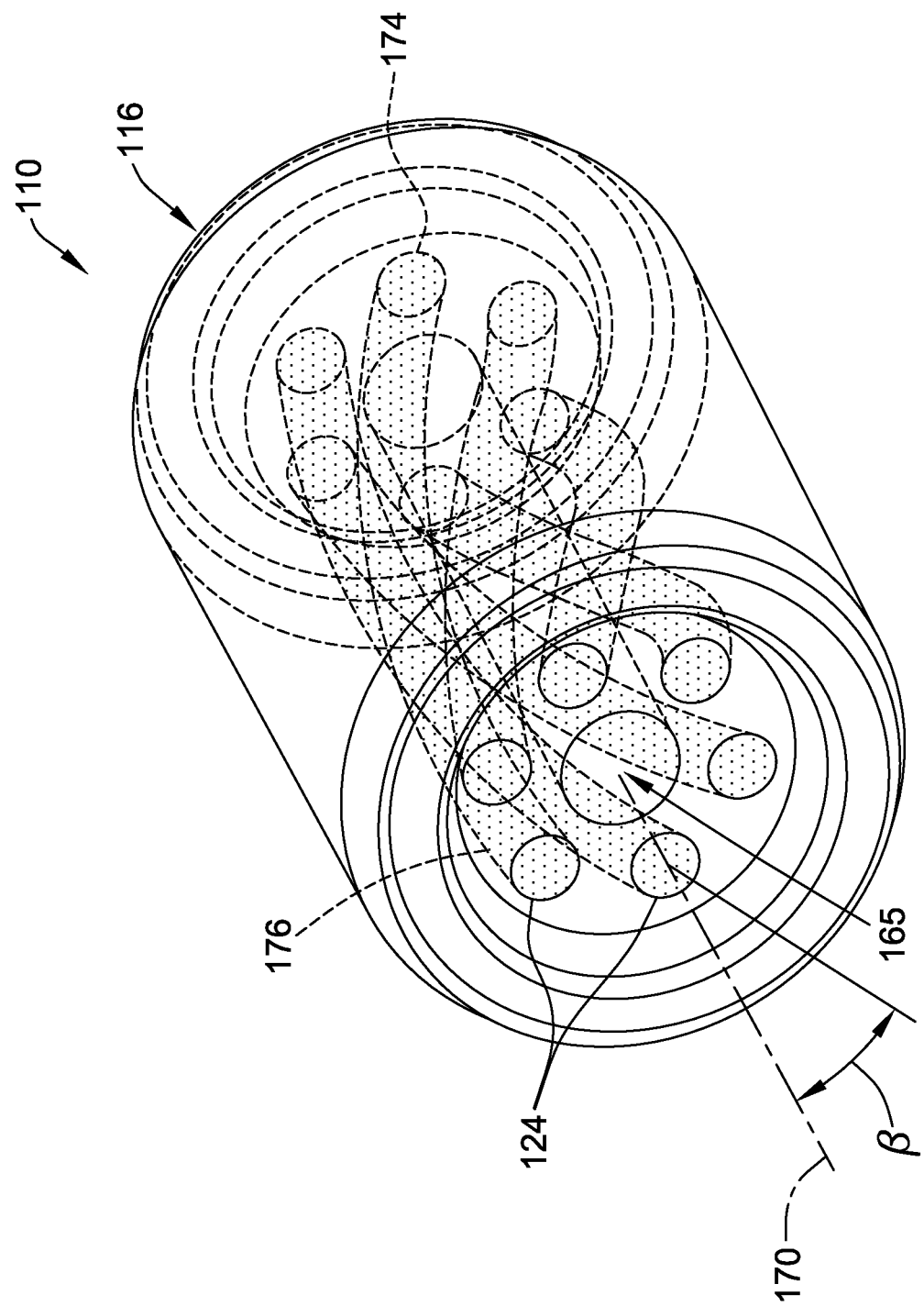
FIG. 13 is a perspective view of another embodiment of the present invention in the form of a rotor having features defining a spiral longitudinal passageway, showing the passageways in phantom.

Referring now to FIG. 13, another embodiment of the present invention is shown in greater detail as rotor 116 for motor 110. The rotor 116, as shown, includes a plurality equally spaced-apart rotor passageways 124. The passageways 124 are sized for optimum fluid flow and may be have a smaller cross sectional areas in the middle of the passageways 124. The rotor 114 may include a central opening 165 for receiving a motor shaft (not shown). The passageways 124 of the rotor 114 extend from a fluid inlet end 174 to a fluid outlet end 176.

While it should be appreciated that the passageways 124 of the rotor 114 extend from fluid inlet end 174 to fluid outlet end 176 in a direction parallel to rotational axis 170 of rotor 116, preferably, and as shown in FIG. 6, the passageways 124 of the rotor 114 extend in a tangentially progressing direction from fluid inlet end 174 to fluid outlet end 176. It should be appreciated that the tangentially progressing direction may result in the passageways forming a cylindrical helix. If the passageways extend in a cylindrical helix, the passageways may extend in a oblique angle β of from 10 to 80 degrees. It should be appreciated that the tangentially progressing direction may be clockwise or counterclockwise.

Figure 14:
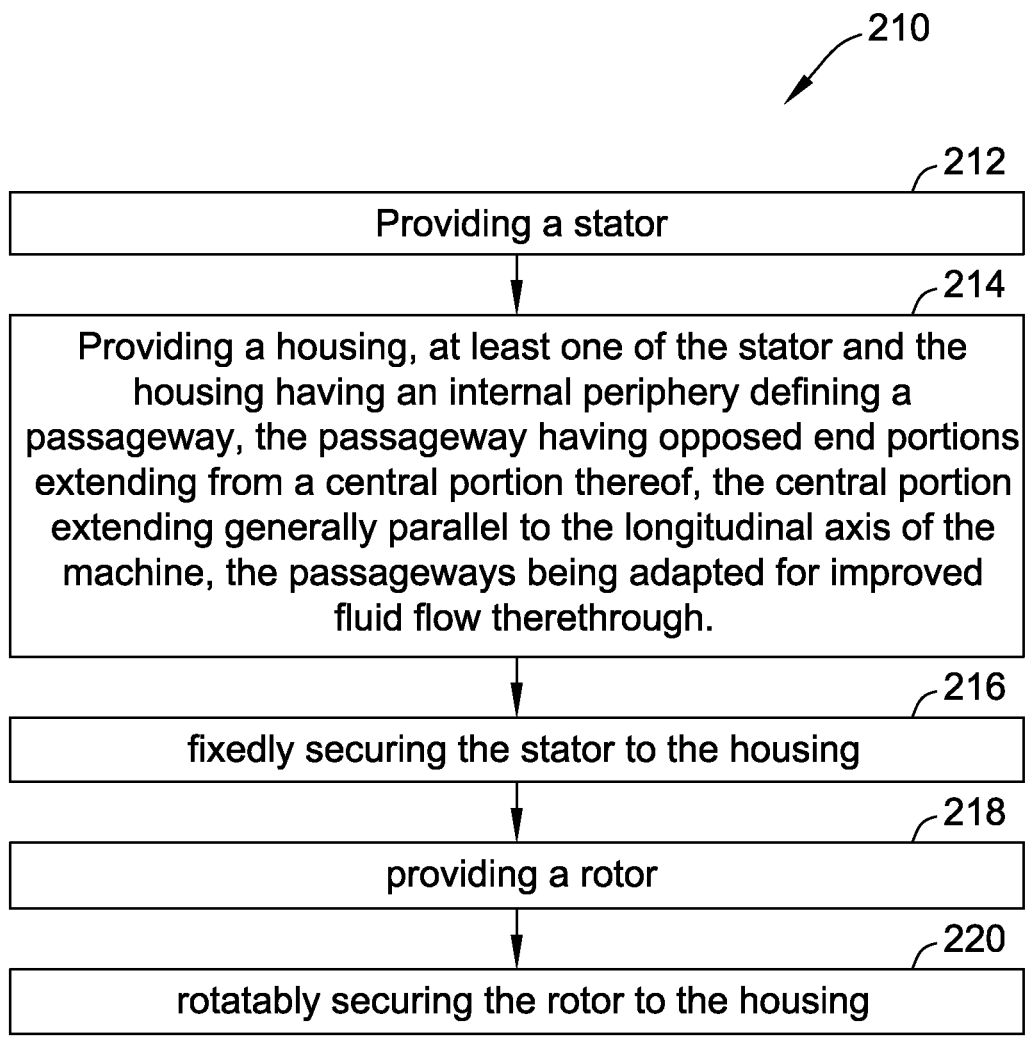
FIG. 14 is a flow chart of another exemplary method for providing the electric machine, according to another embodiment of the present invention.

According to another embodiment of the present invention and referring now to FIG. 14, a method 210 for making an electric machine with improved fluid flow is provided. The method includes step 212 of providing a stator and step 214 of providing a housing. At least one of the stator and the housing has an internal periphery defining a passageway. The passageway has opposed end portions extending from a central portion thereof. The central portion extends generally parallel to the longitudinal axis of the machine. The passageways are adapted for improved fluid flow therethrough. The method 210 further includes the step 216 of fixedly securing the stator to the housing, the step 218 of providing a rotor and the step 220 of rotatably securing the rotor to the housing.

According to another aspect of the present invention, the method 210 may be provided such that the cross sectional area of the central portion is smaller than the cross sectional area of the end portions.

According to another aspect of the present invention, the method 210 may be provided such that the rotor includes a second inner wall defining a first longitudinally extending rotor passageway. The rotor passageway is adapted for improved fluid flow therethrough.

According to another aspect of the present invention, the method 210 may be provided such that the rotor passageways are spaced from each other and are generally spirally shaped.

According to another aspect of the present invention, the method 210 may be provided such that the cross sectional area of the central portion of the tube is smaller than the cross sectional area of the end portions of the tube.

According to another aspect of the present invention, the method 210 may be provided such that the rotor defines a rotor fin for generating air flow.

The methods, systems, and apparatus described herein facilitate efficient and economical assembly of an electric machine, for example a generator or a motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s) etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet motor that reduces or eliminates the efficiency loss caused by the lower cost material. Furthermore, the exemplary methods system and apparatus achieve increased efficiency while reducing or eliminating an increase of the length of the motor. The methods, system and apparatus described herein may be used in any suitable application. However, they are particularly suited for HVAC and pump applications.

Exemplary embodiments of the fluid flow device and system are described above in detail. The electric motor and its components are not limited to the specific embodiments described herein, but rather, components of the systems may be utilized independently and separately from other components described herein. For example, the components may also be used in combination with other motor or generator systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine, comprising:
   a housing, wherein said housing includes an inner wall, the inner wall defining a plurality of circumferentially-spaced openings extending longitudinally along an exterior of said inner wall, wherein the openings have opposed end portions extending from a central portion thereof, the central portion extending generally parallel to the longitudinal axis of the machine, wherein the cross-sectional area of the central portion is smaller than the cross sectional area of the end portions, wherein the end portions extend at least partially normal to the longitudinal axis of the machine, said housing includes opposed end caps;
   a stator fixedly secured to said housing;
   a rotor, defining an outer circumference thereof and opposed ends thereof, said rotor rotatably secured to said housing, said rotor including an inner wall defining a spiral passageway thereof and separated from the outer circumference of the rotor and radially enclosed with only axial openings at opposed first and second ends of said rotor, the spiral passageway adapted for improved fluid flow therethrough, wherein the spiral passageway has opposed end portions extending from a central portion thereof, wherein the cross-sectional area of the central portion is smaller than the cross sectional area of the end portions, wherein the end caps at least partially define a flow channel that couples the housing openings in flow communication with the spiral passageway to form a fluid flow path;
   a first set of fins connected to the rotor, rotating therewith, and positioned proximate the first end of the rotor such that said first set of fins extend in an axial direction from said rotor first end toward a first end cap of the opposed end caps;
   a second set of fins connected to the rotor, rotating therewith, and positioned proximate the second end of the rotor, opposed to the first end of the rotor such that said second set of fins extend in an axial direction from said rotor second end toward a second end cap of the opposed end caps, the second set of fins being substantially larger than the first set of fins, said first set of fins and said second set of fins generating a pressure gradient and a resultant air flow with the air flow being from the second set of fins to the first set of fins; and
   a fan positioned external to the second set of fins and positioned at least partially within one of the end caps.

2. The electric machine as in claim 1, wherein at least one of said housing, said stator and said rotor includes a second inner wall, the second inner wall defining a second longitudinally extending passageway, the second passageway spaced from the the spiral passageway.

3. The electric machine as in claim 2, wherein the second inner wall includes at least one of texture or protrusions thereon adapted to improve heat transfer in the electric machine.

4. The electric machine as in claim 2, wherein said one of said at least one of said housing and said stator including the second inner wall defining the passageway further includes a plurality of components, one of the plurality of components including the inner wall defining the passageway.

5. The furnace blower assembly as set forth in claim 1, wherein said protrusion of the outlet of said housing has a generally uniform cross section.

6. The electric machine as in claim 1, wherein said first set of fins and said second set of fins generate the fluid flow path that travels from said second set of fins into a first end chamber defined by a first end cap of the opposed end caps, through said plurality of exterior housing openings, into a second end chamber defined by a second end cap of the opposed end caps, through said first set of fins, and through said spiral passageway to said second set of fins.

7. The electric machine as in claim 1, wherein said housing inner wall defines an inner chamber that houses said rotor and said stator, and wherein said plurality of circumferentially-spaced openings extending longitudinally along an exterior of said inner wall.

8. A rotor for use in an electric machine, said rotor defining an outer circumference thereof and opposed ends thereof, said rotor having an inner wall defining a longitudinally extending spiral passageway thereof and separated from the outer circumference of the rotor and radially enclosed with only axial opening at each end of said rotor, the spiral passageway adapted for improved fluid flow therethrough, wherein the inner wall of said rotor includes protrusions thereon adapted to improve heat transfer in the electric machine, wherein the spiral passageway has opposed end portions extending from a central portion thereof, wherein the cross-sectional area of the central portion is smaller than the cross sectional area of the end portions, wherein said rotor includes a first set of fins positioned proximate a first end of the rotor such that said first set of fins extend in an axial direction from said first end; wherein the rotor includes a second set of fins positioned proximate a second end of the rotor, opposed to the first end of the rotor such that said second set of fins extend in an axial direction from said second end.

9. A method for making an electric machine with improved fluid flow, the method comprising:
providing a stator;
providing a housing including a wall that defines an inner chamber and that at least partially defines a plurality of longitudinal passageways extending along an exterior of the wall, the passageways having opposed end portions extending from a central portion thereof, the central portion extending generally parallel to the longitudinal axis of the machine, the passageways adapted for improved fluid flow therethrough, the housing including opposed first and second end caps;
fixedly securing the stator to the housing;
providing a rotor;
providing a first set of fins connected to the rotor, rotating therewith, and positioned proximate a first end of the rotor such that said first set of fins extend in an axial direction from said rotor first end toward a first end cap of the opposed end caps;
providing a second set of fins connected to the rotor, rotating therewith, and positioned proximate a second end of the rotor, opposed to the first end of the rotor such that said second set of fins extend in an axial direction from said rotor second end toward a second end cap of the opposed end caps, the second set of fins being substantially larger than the first set of fins;
positioning a first shield axially between the first set of fins and the first end cap such that the first shield is radially aligned with the first set of fins;
positioning a second shield axially between the second set of fins and the second end cap such that the second shield is radially aligned with the second set of fins;
rotatably securing the rotor to the housing; and
generating a pressure gradient and a resultant air flow with the first set of fins and the second set of fins with the air flow being from the second set of fins to the first set of fins, wherein the cross sectional area of the central portion is smaller than the cross sectional area of the end portions, wherein the step of providing a rotor comprises defining an outer circumference thereof and opposed ends thereof, rotatably securing the rotor to the housing, including an inner wall in the rotor that defines a spiral passageway thereof, that is separated from the outer circumference of the rotor, and that is radially enclosed with only axial opening at each end of the rotor, and adapting the spiral passageway for improved fluid flow, thereby creating a suction force through the passageway with the shields over the rotor fins, wherein the end caps at least partially define a flow channel that couples the housing passageway in flow communication with the spiral passageway to form a fluid flow path.

10. The method as in claim 9, wherein the step of providing a second set of fins comprises providing the second set of fins wherein the quantity of fins of the second set of fins are same as the first set of fins.

11. An electric machine, comprising:
a housing, wherein said housing includes an inner wall, the inner wall defining a plurality of circumferentially-spaced openings extending longitudinally along an exterior of said inner wall, wherein the openings have opposed end portions extending from a central portion thereof, the central portion extending generally parallel to the longitudinal axis of the machine wherein the cross-sectional area of the central portion is smaller than the cross sectional area of the end portions, wherein the end portions extend at least partially normal to the longitudinal axis of the machine, said housing defining internal protrusions extending inwardly and longitudinally along the inner wall defining the opening, said housing further defining external protrusions extending outwardly and longitudinally adjacent the inner wall defining the opening, wherein said housing includes a pair of opposing end caps;
a stator fixedly secured to said housing;
a rotor, rotatably secured to said housing, at least one of said housing, said stator and said rotor including an inner wall defining a passageway adapted for improved fluid flow therethrough, wherein said rotor defines a first set of rotor protrusions positioned on a first end of said rotor for generating fluid flow and a second set of rotor protrusions positioned on a second end of said rotor, opposed to the first end of said rotor, said first set of rotor protrusions and said second set of rotor protrusions generating fluid flow within said housing, said first set of rotor protrusions being substantially smaller than said second set of rotor protrusions to expedite a pressure gradient and a fluid flow from the second set of rotor protrusions to the first set of rotor protrusions, wherein said rotor defines an outer circumference thereof and opposed ends thereof, said rotor having an inner wall defining a longitudinally extending spiral passageway thereof and separated from the outer circumference of the rotor and radially enclosed with only an axial opening at each end of said rotor, the spiral passageway adapted for improved fluid flow therethrough, wherein said protrusions comprise fins, wherein the first set of rotor protrusions extend perpendicularly from the first end of said rotor and the second set of rotor protrusions extend perpendicularly from the second end of said rotor;
a first shield positioned axially between the first set of rotor protrusions and a first end cap of the opposing end caps such that the first shield is radially aligned with the first set of rotor protrusions; and
a second shield positioned axially between the second set of rotor protrusions and a second end cap of the opposing end caps such that the second shield is radially aligned with the second set of fins.

* * * * *